(12) United States Patent
Minaai et al.

(10) Patent No.: US 7,165,424 B2
(45) Date of Patent: Jan. 23, 2007

(54) METHOD OF JOINING GLASS PLATES

(75) Inventors: Tetsuo Minaai, Osaka (JP); Richard Edward Collins, Sydney (AU); Nelson Ng, Sydney (AU)

(73) Assignees: Nippon Sheet Glass Co., Ltd., Osaka (JP); The University of Sydney, Sydney (AU)

( * ) Notice: Subject to any disclaimer, the term of this patent is extended or adjusted under 35 U.S.C. 154(b) by 579 days.

(21) Appl. No.: 10/450,291

(22) PCT Filed: Jun. 20, 2002

(86) PCT No.: PCT/JP02/06191

§ 371 (c)(1),
(2), (4) Date: Jun. 12, 2003

(87) PCT Pub. No.: WO03/000613

PCT Pub. Date: Jan. 3, 2003

(65) Prior Publication Data

US 2004/0028846 A1    Feb. 12, 2004

(30) Foreign Application Priority Data

Jun. 22, 2001   (JP) ............................. 2001-189672

(51) Int. Cl.
*C03B 23/20*   (2006.01)
*E06B 3/24*    (2006.01)

(52) U.S. Cl. ............................................. 65/34; 65/36

(58) Field of Classification Search .................... 65/34, 65/36; 156/104, 107, 109, 286
See application file for complete search history.

(56) References Cited

U.S. PATENT DOCUMENTS

| | | | |
|---|---|---|---|
| 5,902,652 A | 5/1999 | Collins et al. | |
| 6,054,195 A | 4/2000 | Collins et al. | |
| 6,103,324 A | 8/2000 | Collins et al. | |
| 6,309,733 B1* | 10/2001 | Minaai et al. | 428/192 |
| 6,468,610 B1* | 10/2002 | Morimoto et al. | 428/34 |
| 6,506,272 B1* | 1/2003 | Aggas | 156/109 |
| 6,641,689 B1* | 11/2003 | Aggas | 156/109 |
| 2004/0028846 A1* | 2/2004 | Minaai et al. | 428/34 |

* cited by examiner

*Primary Examiner*—Steven P. Griffin
*Assistant Examiner*—Carlos Lopez
(74) *Attorney, Agent, or Firm*—Fulbright & Jaworski L.L.P.

(57) ABSTRACT

In order to provide a method of manufacturing a glass panel which, in time of a baking process, restrains an internal stress generated in both of glass plates (1, 2) to prevent a decline in strength, and restrains inorganic and organic substances remaining within a void (V) defined between the glass plates (1, 2) to prevent deterioration in quality, a method of manufacturing a glass panel comprises the steps of executing a joining process for joining the pair of glass plates (1, 2) opposed to each other across the void (V) at peripheries thereof by using a low melting point glass (4) in a melted condition, executing a baking process for suctioning gas from said void (V) through a suction portion disposed in said glass plates while heating said void (V) defined between the glass plates (1, 2), and sealing said suction portion to seal said void (V), wherein the gas is suctioned from said void (V) with said low melting point glass (4) being in a softened condition in which a coefficient of viscosity thereof is $10^{10}$ Pascal seconds (Pa·s) or less when said baking process is executed.

6 Claims, 4 Drawing Sheets

METHOD OF JOINING GLASS PLATES

TECHNICAL FIELD

The present invention relates to a method of manufacturing a glass panel comprising the steps of executing a joining process for joining a pair of glass plates opposed to each other across a void at peripheries thereof by using a low melting point glass in a melted condition, executing a baking process for drawing and removing the gas from the void through a suction portion disposed in the glass plates while heating the void defined between the glass plates, and then sealing the suction portion to seal the void.

BACKGROUND ART

Conventionally, in manufacture of such glass panel, paste-like low melting point glass is applied to peripheries of both of the glass plates and heated to 480° C. or more as shown in FIG. 6 to melt the low melting point glass. Thereafter, the glass is cooled to room temperature and solidified to execute the joining process for sealing and joining the glass plates at the peripheries thereof.

Then, the void defined between the glass plates and the low melting point glass which have been cooled to room temperature are heated again to about 200° C. for drawing and removing the gas from the void to execute the baking process.

Since the baking process has conventionally been executed at the temperature around 200° C., there have been disadvantages as follows.

As illustrated in FIG. 7, atmospheric pressure acts on surfaces of the glass plates 1A and 2A when the gas is drawn and removed from the void defined between the glass plates. The low melting point glass 4A is in a generally hardened condition at the temperature around 200° C. as in the conventional method, specifically the temperature around 200° C. established by reheating the glass after the glass is once cooled to room temperature. As a result, the glass plates 1A and 2A undergo an internal stress as shown in arrows (solid lines) to bulge and bend toward the void V, which decreases the strength of the glass plates 1A and 2A. In an extreme case, the glass plates 1A and 2A bear the internal stress at end portions thereof as shown in arrows (broken lines) to bend outwardly, which leads to a drawback that the glass plates 1A and 2A easily break around the end portions thereof.

The glass plates 1A and 2A are heated to 480° C. or more when the joining process is executed for joining the glass plates. Thus, inorganic substances including Na are generated from the glass plates 1A and 2A. Also, organic substances are generated from a binder mixed into the low melting point glass 4A. These inorganic and organic substances adhere to inner surfaces of the glass plates 1A and 2A. These substances are not completely drawn and removed from the void by the baking process executed at the temperature around 200° C., and remain adhering to the inner surfaces of the glass plates 1A and 2A. As a result, the quality of the glass panel could be lowered.

Specifically, when the glass plates 1A and 2A comprise special glass with a special coating having a heat-absorbing or ultraviolet-absorbing function applied to the inner surfaces thereof, the inorganic or organic substances may remain in and adhere to flaws in the coating on the inner surfaces thereof. As a result, the flaws of the coating become noticeable to cause a significant quality deterioration.

The present invention has been made having regard to the conventional problems as described above, and its object is to minimize an internal stress generated in the glass plates, when a baking process is executed, to prevent a decline in strength. Another object of the invention is to provide a method of manufacturing a glass panel capable of restraining inorganic and organic substances from remaining in a void defined between the glass plates to the utmost to prevent deterioration in quality.

DISCLOSURE OF THE INVENTION

The characteristic features of a method of manufacturing a glass panel according to the present invention are as follows.

The invention according to claim 1, as illustrated in FIG. 3, provides a method of manufacturing a glass panel comprising the steps of executing a joining process for joining a pair of glass plates opposed to each other across a void at peripheries thereof by using a low melting point glass in a melted condition, executing a baking process for suctioning gas from said void through a suction portion disposed in said glass plates while heating said void defined between the glass plates, and sealing said suction portion to seal said void, characterized in that the gas is suctioned from said void with said low melting point glass being in a softened condition in which a coefficient of viscosity thereof is $10^{10}$ Pascal seconds (Pa·s) or less when said baking process is executed.

With the characteristic feature of the invention according to claim 1, since the gas is drawn and removed from the void with the low melting point glass for joining the glass plates at the peripheries thereof being in the softened condition in which the coefficient of viscosity thereof is $10^{10}$ Pascal seconds (Pa·s) or less when the baking process is executed for drawing and removing the gas from the void while heating the void between the glass plates, the low melting point glass in the softened condition can be deformed even if atmospheric pressure acts on surfaces of the glass plates as a result of the gas suction. This restrains an internal stress from being generated in the glass plates and further restrains the glass plates from bending outwardly at end portions thereof, thereby to prevent a decline in strength of the glass plates.

Further, the baking process is executed with the low melting point glass being in the softened condition in which the coefficient of viscosity thereof is $10^{10}$ Pascal seconds (Pa·s) or less, i.e. the temperature of the void between the glass plates being around 350° C. Thus, the inorganic substances including Na or organic substances generated in time of executing the joining process and remaining in the void, especially adsorbed to and remaining in the surfaces of the glass plates facing the void are almost entirely vaporized. Therefore, the inorganic and organic substances remaining on the surfaces of the glass plates can be reliably drawn and removed through the baking process.

This can prevent deterioration in quality of the glass panel, and even if the glass plates comprise special glass with a coating applied to inner surfaces thereof having a heat-absorbing or ultraviolet-absorbing function, deterioration in quality can be effectively prevented by restraining the inorganic and organic substances from adhering to flaws of the inner coating.

The invention according to claim 2, as illustrated in FIGS. 3 and 5, is characterized in that said baking process is executed after said joining process is executed and before the coefficient of viscosity of the low melting point glass which has been in the melted condition in the joining process exceeds $10^{10}$ Pascal seconds (Pa·s).

With the characteristic feature of the invention according to claim 2, the baking process is executed after the joining process is completed and before the coefficient of viscosity of the low melting point glass which has been in the melted condition in the joining process exceeds $10^{10}$ Pascal seconds (Pa·s). Thus, a manufacturing process from the joining process to the baking process, more specifically heating of the void between the glass plates and the low melting point glass, can be effectively and efficiently carried out, compared with the case where the glass is once cooled to room temperature after the joining process is completed and then heated again. Also, there is no need to repeat heating and cooling, which restrains more reliably an internal stress from being generated in the glass plates.

The invention according to claim 3, as illustrated in FIGS. 1 to 4, is characterized in that said suction portion is a suction bore provided in one glass plate of said glass plates.

The suction portion for decompressing the void may be provided at peripheries of the glass panel where the glass plates are opposed to each other, for example. However, the glass panel includes the joint portions at the peripheries thereof to join the glass plates by the low melting point glass as noted above. It is required to ensure the sealing efficiency of the joint portions in order to maintain the decompressed condition of the glass panel for a long period. For this reason, it is avoided to form the suction portion in the joint portion in this arrangement, and instead the suction bore acting as the suction portion is formed in one of the glass plates, which ensures the decompressed condition of the glass panel.

Also, it is conceivable that an extremely narrow gap is defined between the glass plates. If an attempt is made to form the suction bore in opposed portions of the glass plates in such a case, it becomes difficult to secure an opening area required for suction. On the other hand, when the suction bore is formed in one of the glass plates as in this arrangement, an opening area may be relatively freely determined, thereby to facilitate an operation for forming the suction portion.

The invention according to claim 4, as illustrated in FIG. 3, is characterized in that a tubular member is inserted into said bore formed in said one glass plate to protrude outwardly of said one glass plate, and a crystalline low melting point is provided around the protruding portion of the tubular member for adhering said tubular member to said glass plate to heat and melt said crystalline low melting point glass and decompress a portion around said crystalline low melting point glass and said tubular member, thereby to suction the gas from said void to execute the baking process.

When the protruding portion is formed by using the tubular member as in the invention according to claim 4, a sealing operation of the tubular member is facilitated after the decompression process is completed. For example, to heat and melt a distal end of the protruding portion of the tubular member is advantageous when various heating elements are attached.

Also, according to the present method, it is possible to heat only the distal end of the protruding portion of the tubular member, thereby to restrain the heat generated with heating from being transmitted to the surfaces of the glass plates. Thus, when the glass plates are heat-tempered, the decompressing process may be executed without diminishing the effect of the heat-tempering process.

Further, in this arrangement, since the crystalline low melting point glass is used for adhering the tubular member to the glass plate, the decompressing process is more reliably executed. In the conventional art, for example, when the portion around the low melting point glass is decompressed for the baking process, the low melting point glass is foamed to possibly hamper air-tightness between the tubular member and the glass plate or deteriorate adhesive strength. In this regard, the low melting point glass according to the present invention is the crystalline low melting point glass in which crystallization is promoted and completed in a high-temperature range. Thus, the low melting point glass in the melted condition is restrained from being foamed even if the portion around the low melting point glass is decompressed for the baking process. As a result, it is possible to reliably and rigidly adhere the tubular member to one of the glass plates, thereby to attain excellent air-tightness.

The invention according to claim 5, as illustrated in FIG. 1, is characterized in that numerous spacers for maintaining said void between said pair of glass plates are arranged such that a distance between an outermost row of the spacers positioned closest to edges of the glass plates and peripheral elements including the low melting point glass may be smaller than a distance between the outermost row of the spacers and an adjacent, second outermost and other rows of the spacers, thereby to seal said void in a decompressed condition.

With the characteristic feature of the invention according to claim 5, numerous spacers are provided in the void between the pair of glass plates, and the void is sealed in the decompressed condition. Thus, it is possible to provide a glass panel of high quality having an excellent thermal insulation effect due to decompression of the void.

Further, in arranging the numerous spacers in the void between the glass plates, the distance between the outermost row of the spacers positioned closest to the edges of the glass plates and peripheral elements including the low melting point glass is smaller than the distance between the outermost row of the spacers and the adjacent, second outermost and other rows of the spacers. With this arrangement, the outermost row of the spacers positioned closest to the edges of the glass plates reliably maintains the void between the glass plates around the peripheries thereof. Therefore, the glass plates are effectively restrained from deforming to bring the peripheries thereof close to each other. Thus, reflected images can be restrained from distorting at the peripheries of each glass plate, thereby to eliminate visual awkwardness.

The invention according to claim 6, as illustrated in FIGS. 1 and 3, is characterized in that said pair of glass plates are placed such that the peripheries of one glass plate of said pair of glass plates may protrude from the peripheries of the other glass plate, and wherein the paste-like low melting point glass is applied to said protruding portion.

When the baking process is executed before the low melting point glass reaches $10^{10}$ Pascal seconds or more, the low melting point glass which has not yet solidified undergoes a force to move inwardly from the peripheries by atmospheric pressure. In this state, if the low melting point glass is insufficient in quantity, the entire low melting point glass is drawn inwardly of the void, as a result of which the joint portions may not have a normal configuration or may be perforated.

Thus, the paste-like low melting point glass is applied to the peripheries of one of the glass plates protruding from the peripheries of the other of the glass plates as defined in claim 6, thereby to provide a sufficient quantity of the low melting point glass and to eliminate the above-noted disadvantages to obtain excellent joint portions.

BEST MODE FOR CARRYING OUT THE INVENTION

A method of manufacturing a glass panel in an embodiment of to the present invention will be described hereinafter with reference to the drawings.

Figure 1:
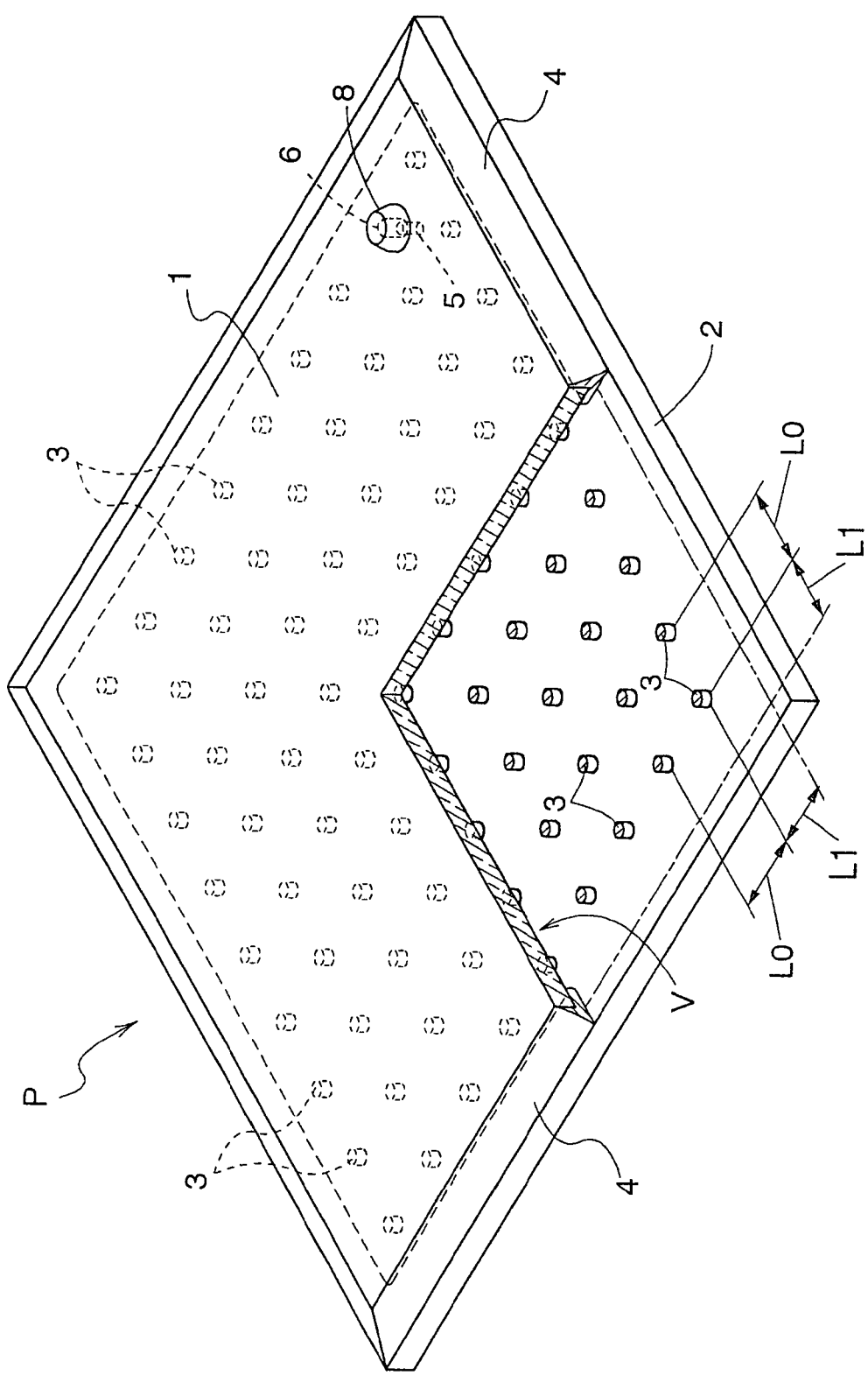
FIG. 1 is a partly cut away perspective view of a vacuum double glazing.

An example of such a glass panel is a vacuum double glazing. As shown in FIG. 1, the vacuum double glazing P comprises a pair of glass plates 1 and 2 and numerous spacers 3 arranged therebetween. Thus, the glass plates 1 and 2 are arranged opposite each other with a void V defined therebetween. Both of the glass plates 1 and 2 are joined at peripheries thereof by low melting point glass 4 having a lower melting point and lower gas permeability than the glass plates 1 and 2, with the void V between the glass plates 1 an 2 being sealed in a decompressed condition.

A suction portion formed in either one of the glass plates or extending through both of the glass plates is used for decompressing the void V defined between the glass plates 1 and 2.

Transparent float glass of approximately 2.65 to 3.2 mm thick, for example, is used for the glass plates 1 and 2. The void V defined between the glass plates 1 and 2 is decompressed to 1.33 Pa ($1.0 \times 10^{-2}$ Torr) or less.

Figure 4:
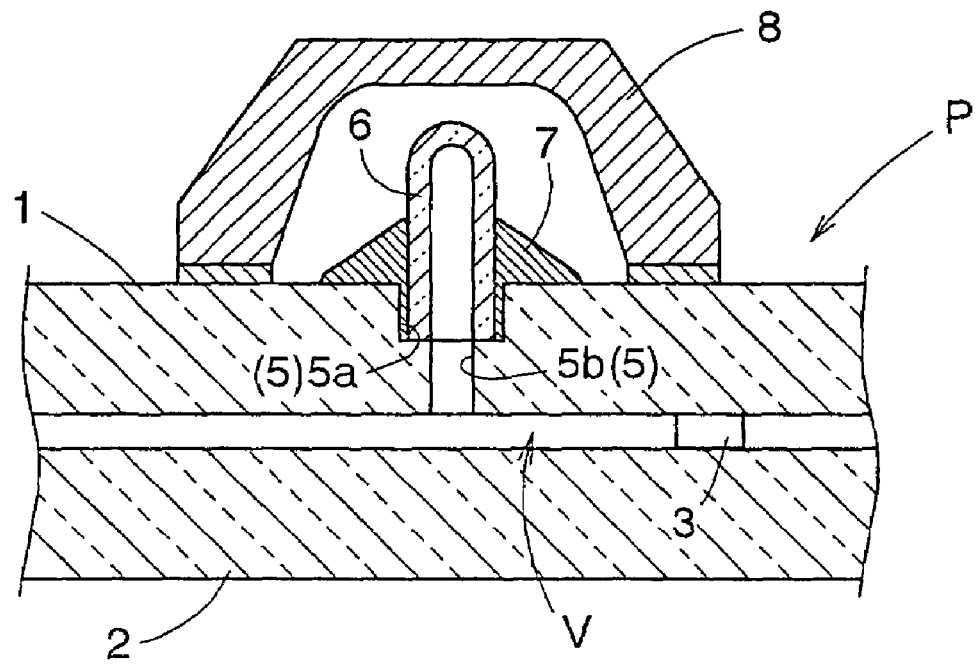
FIG. 4 is a sectional view of a principal portion of the vacuum double glazing.

In order to decompress the void V, as illustrated in FIG. 4, a suction bore 5 is formed in one of the glass plates 1, which bore includes a large bore 5a of approximately 3 mm in diameter and a small bore 5b of approximately 2 mm in diameter, for example. A glass tube 6 acting as a tubular member is inserted into the large bore 5a. The glass tube 6 is rigidly bonded to the glass plate 1 by crystalline low melting point glass 7 having a lower melting point than the glass tube 6 and glass plate 1.

The suction portion for decompressing the void V may be provided at a periphery of the glass panel where the glass plates 1 and 2 are opposed to each other, for example. However, the glass panel includes joint portions at the peripheries thereof to join the glass plates by the low melting point glass 4 as noted above. A reliable sealing performance is required at the joint portions in order to maintain the decompressed condition of the glass panel for a long period. For this reason, this embodiment avoids forming the suction portion at a joint portion, and instead the suction bore 5 acting as the suction portion is formed in one of the glass plates 1 and 2, which ensures the decompressed condition of the glass panel.

Also, it is conceivable that an extremely narrow gap is defined between the glass plates 1 and 2. If an attempt is made to form the suction bore 5 in opposed portions of the glass plates 1 and 2 in such a case, it becomes difficult to secure an opening area required for suction. On the other hand, when the suction bore 5 is formed in one of the glass plates 1 and 2 as in this arrangement, an opening area may be relatively freely determined, thereby to facilitate an operation for forming the suction portion.

After an operation for decompressing the void V is completed, the glass tube 6 is melted and sealed at a distal end thereof and then entirely covered by a cap 8.

The spacers 3 preferably have a cylindrical configuration. They are made of a material having a compressive strength of at least $4.9 \times 10^8$ Pa ($5 \times 10^3$ kgf/cm$^2$), e.g. stainless steel (SUS304), Inconel 718 or the like, to be endurable against the atmospheric pressure acting on both of the glass plates 1 and 2.

In the case of the cylindrical configuration, the spacers 3 are about 0.3 to 1.0 mm in diameter and about 0.15 to 1.0 mm in height.

The intervals between the spacers 3 are set to about 20 mm where the glass plates 1 and 2 are 3 mm thick, for example. This value may be varied as appropriate with the thickness of the glass plates.

However, in arranging the numerous spacers 3 as illustrated in FIG. 1, a distance L1 between an outermost row of spacers positioned closest to the edges of the glass plates 1 and 2 and peripheral elements consisting of the low melting point glass 4 is set to be smaller than a distance L0 between the outermost row of spacers and an adjacent, second outermost and next rows of spacers. For example, where the distance L0 is set to approximately 20 mm, the distance L1 is set to 0 to less than 20 mm, preferably about 0 to 15 mm. This is done for the following reason.

The low melting point glass 4 is softened in time of a baking process. On the other hand, the height of the spacers 3 disposed between the glass plates 1 and 2 hardly changes. As a result, when the glass plates 1 and 2 are pressed by atmospheric pressure in time of the baking process, the peripheries of the glass plates supported by the low melting point glass 4 are easily displaced. To diminish such displacement, portions around the peripheries of the glass plates 1 and 2, i.e. portions protruding from positions supported by the outermost spacers 3 should be shortened. Thus, the distance L1 is set smaller than the distance L0 in this arrangement. As a result, the peripheries of both of the glass plates are effectively restrained from displacing as the baking process is executed, and reflected images on the peripheries of each glass plate are restrained from distorting, thereby to eliminate visual awkwardness.

Next, a process for manufacturing the vacuum double glazing P will be described. It should be noted that this manufacturing process is recited by way of example and parts of the manufacturing process may be performed in a reversed order in an actual situation.

First, one of the glass plates 2 not having the suction bore 5 formed therein is supported in a substantially horizontal position. The paste-like low melting point glass 4 is applied to a top surface of the glass plate at the peripheries thereof, and the numerous spacers 3 are arranged at predetermined intervals. Then, the other glass plate 1 is placed over the spacers.

Figure 3:
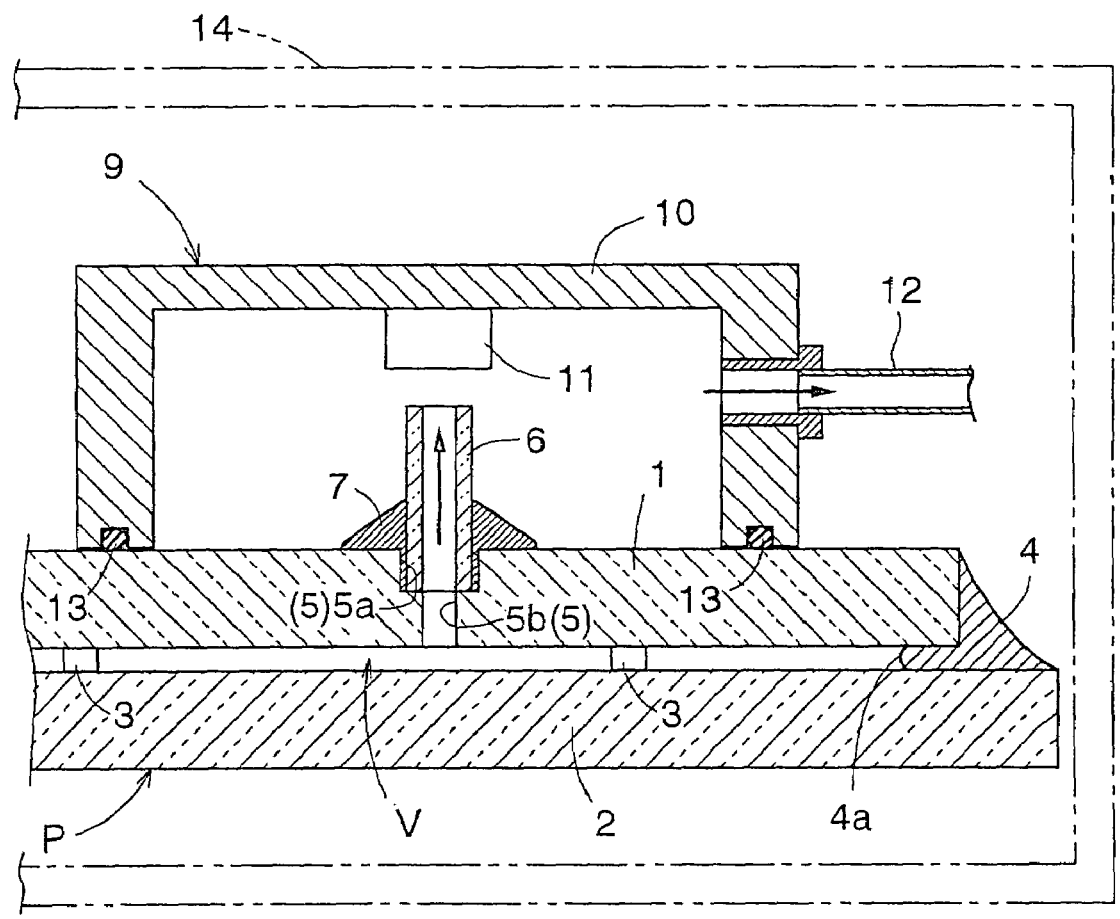
FIG. 3 is a sectional view of the vacuum double glazing and a suction sealing device in the manufacturing process.

In this arrangement, as illustrated in FIGS. 1 and 3, the lower glass plate 2 has a slightly larger area such that the peripheries of the lower glass plate may protrude from the peripheries of the upper glass plate 1. This is convenient for application of the low melting point glass 4.

More particularly, when the baking process is performed before the low melting point glass reaches $10^{10}$ Pascal or more, the low melting point glass which has not yet been hardened undergoes a force to move inwardly from the peripheries by atmospheric pressure. If the low melting point glass is insufficient in quantity at that time, the entire low melting point glass will be drawn inwardly. As a result, the joint portions may not have a normal configuration or may be perforated. In view of this, a paste-like material containing a sufficient quantity of low melting point glass 4 is applied to stepped portions formed at the peripheries of the two glass plates 1 and 2 as noted above, thereby to avoid the above disadvantages.

Figure 2:
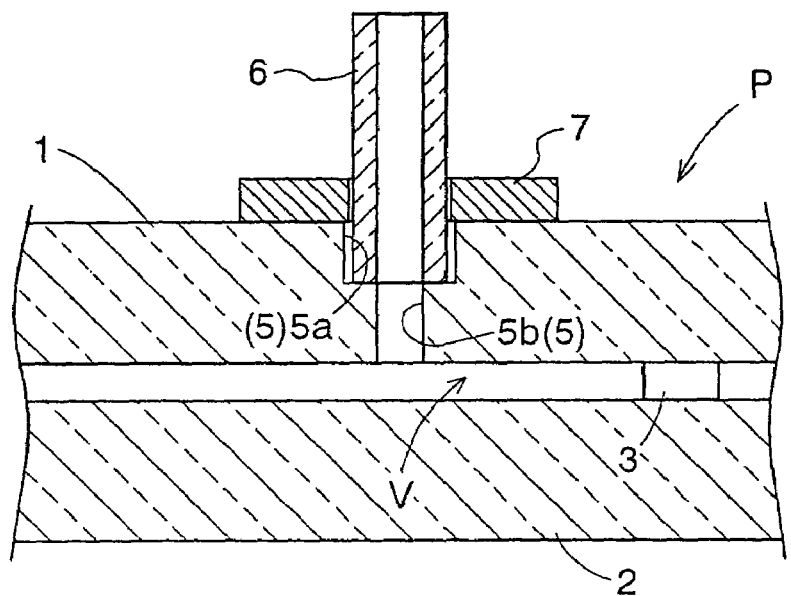
FIG. 2 is a sectional view of a principal portion of the vacuum double glazing in a manufacturing process.

Subsequently, as shown in FIG. 2, the glass tube 6 is inserted into the suction bore 5 formed in the upper glass plate 1. The glass tube 6 is insertable only into the large bore 5a of the suction bore 5 and has a greater length greater than the large bore 5a. Thus, the glass tube 6 has an upper portion protruding upward from the glass plate 1. Around the protruding portion of the glass tube 6 is applied the dough-nut-like crystalline low melting point glass 7 for adhering the glass tube 6 to the glass plate 1. Further, a suction sealing device 9 is placed from above as shown in FIG. 3.

The suction sealing device 9 includes a bottomed cylindrical suction cup 10 and an electric heater 11 provided within the suction cup 10. The device further includes a flexible suction pipe 12 communicating with an interior space of the suction cup 10, and an O-ring 13 for sealing the top surface of the glass plate 1.

Both of the glass plates 1 and 2, covered with the suction sealing device 9, are placed substantially horizontally in a heating furnace 14. The low melting point glass 4 is melted by baking to join the peripheries of the glass plates 1 and 2 to seal the void V to complete a joining process.

Figure 5:
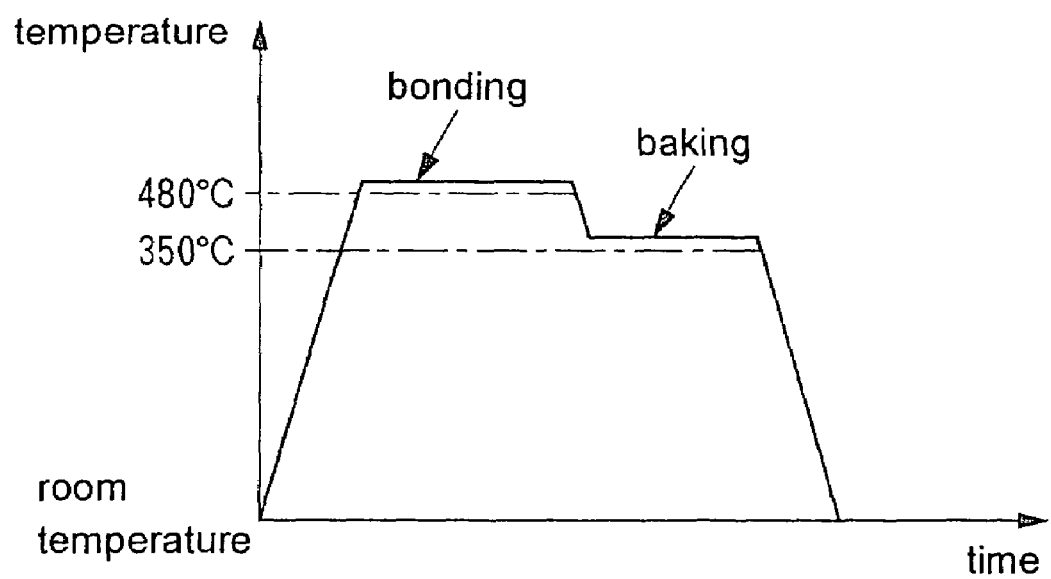
FIG. 5 is a graph showing a relationship between temperature and time in a joining process and baking process.
Figure 6:
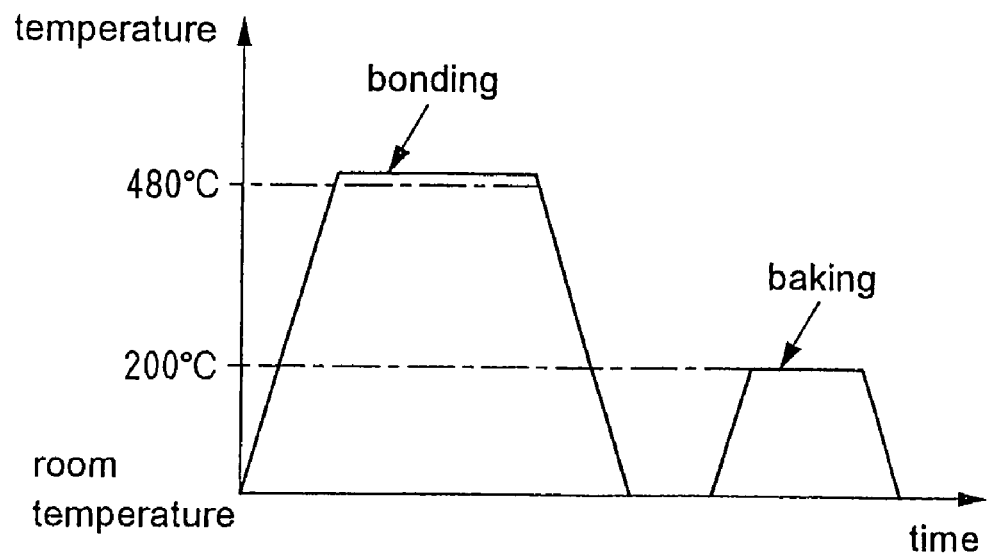
FIG. 6 is a graph showing a relationship between temperature and time in a conventional joining process and baking process.
Figure 7:
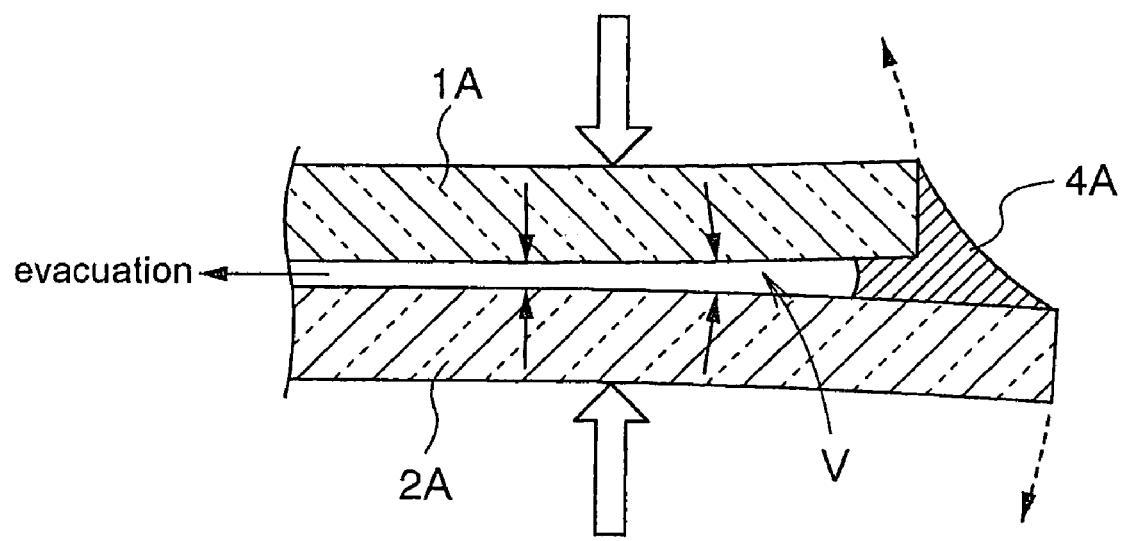
FIG. 7 is an explanatory view of a principal portion of the conventional vacuum double glazing.

More particularly, as shown in FIG. 5, the temperature in the heating furnace 14 is raised to 480° C. or above to melt the low melting point glass 4. Since the melted low melting point glass 4 has excellent wettability for the glass plates 1 and 2, surfaces 4a facing the void V bulge into the void V in a sectional view substantially perpendicular to the glass plates 1 and 2. The crystalline low melting point glass 7 around the glass tube 6 is also melted along with melting of the low melting point glass 4 to flow into a gap between the large bore 5a and the glass tube 6.

The inner temperature of the heating furnace 14 is set to 350° C. or above thereafter. In this state, the low melting point glass 4 is in a softened condition with a coefficient of viscosity at $10^{11}$ poise, or $10^{10}$ Pascal seconds (Pa·s) or less. In other words, the baking process is executed such that, while the low melting point glass 4 is maintained in a condition in which the coefficient of viscosity thereof does not exceed $10^{10}$ Pascal seconds after the temperature of the low melting point glass 4 is lowered, the void V between the glass plates 1 and 2 is heated, and gas is drawn and removed from the void V through the glass tube 6 inserted into the suction bore 5.

If the inner temperature of the heating furnace 14 is lower than 350° C., the coefficient of viscosity of the low melting point glass 4 will exceed $10^{10}$ Pascal seconds. In such a case, the configuration of the joint portions is quite stabilized because the problems of failing to obtain a normal configuration of the joint portions or forming through holes in the joint portions are eliminated. However, it requires a long time to execute the baking process, which results in a disadvantage of reducing productivity. Also, the effect of drawing and removing residues adhering to the glass surfaces facing the void V is decreased. Under the circumstances, it is preferable to execute the baking process within the range of the coefficient of viscosity being less than $10^8$ Pascal seconds of the low melting point glass 4. In this state, the temperature of the low melting point glass 4 becomes generally 380° C. or higher.

With respect to the decompressing operation, the interior of the suction cup 10 is decompressed by using a rotary pump or a turbo molecular pump connected to the flexible pipe 12 thereby to decompress the interior of the void V to 1.33 Pa or less through the glass tube 6 and the small bore 5b.

The void V defined between the glass plates 1 and 2 has been heated to 350° C. or above when the baking process is performed. Thus, inorganic substances including Na generated from the glass plates 1 and 2 in time of the joining process and remaining within the void V, and organic substances generated from the low melting point glass 4 and remaining in the void V have been vaporized. Therefore, the inorganic substances including Na and the organic substances are reliably drawn and removed from the void V through the flexible pipe 12.

Since the low melting point glass 4 is in the softened condition with its coefficient of viscosity at $10^{10}$ Pascal seconds or less, the surfaces 4a thereof facing to the void V bulge and bend toward the void V as a result of the decompression of the void V, as illustrated in FIG. 3.

At this time, the low melting point glass 7 provided around the glass tube 6 is also in a melted condition, but is different from the low melting point glass 4 provided around the glass plates 1 and 2. More particularly, the low melting point glass 7 is crystalline, in which crystallization is promoted and completed in a high temperature range. Therefore, the low melting point glass 4 provided around the glass plates 1 and 2 is not crystallized but is in the softened condition when the baking process is performed, and thus is easily deformed by decompression and suction of the void V. On the other hand, the low melting point glass 7 provided around the glass tube 6 has already been crystallized and thus is not foamed by decompression within the suction cup 10. Thus, the glass tube 6 is reliably sealed and bonded to the glass plate 1 by using the crystalline low melting point glass 7.

Subsequently, the distal end of the glass tube 6 is locally heated to approximately 1000° C. and melted by the electric heater 11. As illustrated in FIG. 4, the vacuum double glazing P is manufactured by sealing an opening at the distal end of the glass tube 6 and adhering the cap 8 to the glass plate 1 after a cooling operation. In the vacuum double glazing P manufactured in such a manner, the surfaces 4a of the low melting point glass 4 facing the void bulge and bend toward the void V in the sectional view substantially perpendicular to the glass plates 1 and 2.

[Other Embodiments]

(1) In the foregoing embodiment, the low melting point glass 4 is heated to 480° C. or above to execute the joining process, and then the baking process is executed before the coefficient of viscosity of the low melting point glass 4 exceeds $10^{10}$ Pascal seconds with a temperature fall thereof. Instead, the low melting point glass 4 may be cooled to room temperature once after the joining process is executed, and then heated again until the coefficient of viscosity thereof reaches $10^{10}$ Pascal seconds or less to execute the baking process.

(2) In the foregoing embodiment, the vacuum double glazing P is shown as one example of glass panels. Instead, the present invention may be applied to manufacture of a plasma display panel or the like in which the void V defined between the glass plates 1 and 2 is filled with gas. In such a case, the void V is filled with a predetermined gas after the baking process is executed.

The glass plates 1 and 2 constituting the glass panel P are not limited to float glass as described in the foregoing embodiment, but a material may be selected as appropriate for various use and purposes of the glass panel P. For example, it is possible to use, alone or in combination, figured glass, obscured glass having a light diffusing function obtained by a surface treatment, net glass, wire glass, tempered glass, double-reinforced glass, low-reflecting glass, high-penetrable sheet glass, ceramic print glass, or special glass having a heat-absorbing or ultraviolet-absorbing function.

Further, with regard to glass composition, soda silica glass, soda lime glass, boric silica glass, aluminosilicate glass, and various types of crystallized glass may be used. The thickness of the glass plates 1 and 2 may also be selected as appropriate.

The material for the spacers 3 is not limited to stainless steel or Inconel. Instead, it is possible to use metals including iron, copper, aluminum, tungsten, nickel, chromium and titanium, alloys such as carbon steel, chromium steel, nickel steel, nickel-chromium steel, manganese steel, chrome-manganese steel, chrome-molybdenum steel, silicon steel, brass, solder and duralumin, and ceramics or glass, which are not easily deformed by external forces. Each spacer is not limited to the cylindrical shape, but may be of various kinds of shape such as prismatic shape or spherical shape.

INDUSTRIAL UTILITY

The glass panel according to the present invention may be applied to manufacture of a plasma display panel in which the void V defined between the glass plates 1 and 2 is filled with gas, besides the vacuum double glazing P as described in the first embodiment.

Also, the glass panel may be used in various fields, e.g. for windowpanes of buildings and vehicles (automobiles, railway carriages, and ships and vessels), and elements of devices such as plasma displays, and doors and walls of various devices such as refrigerators and heat-retaining devices.

The invention claimed is:

1. A method of manufacturing a glass panel comprising the steps of executing a joining process for joining a pair of glass plates opposed to each other across a void at peripheries of said pair of glass plates thereof by using a low melting point glass in a melted condition, executing a baking process for suctioning gas from said void through a suction portion disposed in said glass plates while heating said void defined between the glass plates, and sealing said suction portion to seal said void, wherein the gas is suctioned from said void with said low melting point glass being in a softened condition in which a coefficient of viscosity thereof is $10^{10}$ Pascal seconds (Pa·s) or less when said baking process is executed.

2. A method of manufacturing a glass panel as in claim 1, wherein said baking process is executed after said joining process is executed and before the coefficient of viscosity of the low melting point glass which has been in the melted condition in the joining process reaches $10^{10}$ Pascal seconds (Pa·s) or more.

3. A method of manufacturing a glass panel as in claim 1, wherein said suction portion is a suction bore provided in one glass plate of said glass plates.

4. A method of manufacturing a glass panel as in claim 3, wherein a tubular member is inserted into said bore formed in said one glass plate to protrude outwardly of said one glass plate, and a crystalline low melting point glass is provided around the protruding portion of the tubular member for adhering said tubular member to said glass plate, heating and melting said crystalline low melting point glass and decompress a portion around said crystalline low melting point glass and said tubular member, thereby to suction the gas from said void to execute the baking process.

5. A method of manufacturing a glass panel as in claim 1, wherein numerous spacers for maintaining said void between said pair of glass plates are arranged such that a distance between an outermost row of the spacers positioned closest to edges of the glass plates and peripheral elements including the low melting point glass may be smaller than a distance between the outermost row of the spacers and an adjacent, second outermost and other rows of the spacers, thereby to seal said void in a decompressed condition.

6. A method of manufacturing a glass panel as in claim 1, wherein said pair of glass plates are placed such that the peripheries of one glass plate of said pair of glass plates may protrude from the peripheries of the other glass plate, and wherein the paste-like low melting point glass is applied to the said protruding portion.

* * * * *